United States Patent [19]

Becquelet

[11] 4,418,085
[45] Nov. 29, 1983

[54] PROCESS FOR MANUFACTURING FROZEN FOOD PRODUCTS COMPOSED OF LAYERS OF PASTA AND SAUCE

[75] Inventor: Louis E. Becquelet, Alfortville, France

[73] Assignee: Nuitoni Foods Corporation, South Hackensack, N.J.

[21] Appl. No.: 419,279

[22] Filed: Sep. 17, 1982

[30] Foreign Application Priority Data

Sep. 17, 1981 [FR] France .................... 81 17546

[51] Int. Cl.³ .............................................. A23L 1/16
[52] U.S. Cl. ................................... 426/297; 99/450.1;
99/450.7; 425/96; 425/106; 426/302; 426/303;
426/304; 426/393; 426/502; 426/94
[58] Field of Search .................... 426/19, 94, 295, 296,
426/297, 496, 557, 500–504, 302–304; 425/391,
106, 96, 319; 99/353, 450.2, 450.4, 450.1, 450.6,
450.7

[56] References Cited

U.S. PATENT DOCUMENTS

| | | |
|---|---|---|
| 2,147,098 | 2/1939 | Humphrey ................ 426/94 |
| 3,026,822 | 3/1962 | Gatti ...................... 99/450.6 |
| 3,143,424 | 8/1964 | Wilson ..................... 426/19 |
| 3,532,510 | 10/1970 | Zimmerman ............. 99/450.6 |
| 3,551,161 | 12/1970 | Whitestone ............... 426/297 |
| 3,669,007 | 6/1972 | Pulici ...................... 99/450.6 |
| 3,757,676 | 9/1973 | Pomara .................... 99/450.7 |
| 3,798,343 | 3/1974 | Vitale ...................... 426/502 |
| 3,804,956 | 4/1974 | Bongiovanni ............. 426/297 |
| 4,073,953 | 2/1978 | Trostmann et al. ........ 426/501 |
| 4,084,493 | 4/1978 | Quintana ................. 99/450.7 |
| 4,112,834 | 9/1978 | Thiry ...................... 99/450.1 |
| 4,313,719 | 2/1982 | Lundgren ................. 426/501 |
| 4,321,858 | 3/1982 | Williams ................. 426/500 |

FOREIGN PATENT DOCUMENTS 1248391 9/1971 United Kingdom ........... 99/450.6

Primary Examiner—Steven L. Weinstein
Attorney, Agent, or Firm—Sughrue, Mion, Zinn, Macpeak, and Seas

[57] ABSTRACT

A process for automatically and continuously manufacturing lasagne by forming a continuous sheet of pasta which contains first through fifth longitudinal surface area rows; passing the pasta under a first sauce dispenser which dispenses different kinds of sauces onto the middle three surface area rows of the sheet of pasta; folding the respective outer surface area rows over the respective next inner surface area rows; dispensing additional sauce over an exposed surface of one of the outer folded surface area rows; and further folding the sheet of pasta so that the first through fifth surface area rows are vertically aligned. Subsequently, the sheet of pasta is cut into predetermined sizes, and each predetermined size is placed into its own corresponding food tray. Thereafter, each predetermined size of lasagne is frozen. This process allows lasagne to be efficiently and quickly produced at a relatively low cost.

10 Claims, 5 Drawing Figures

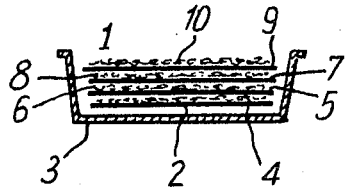
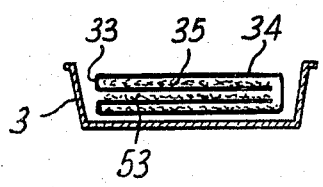
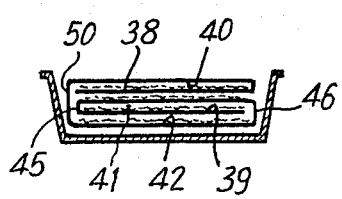
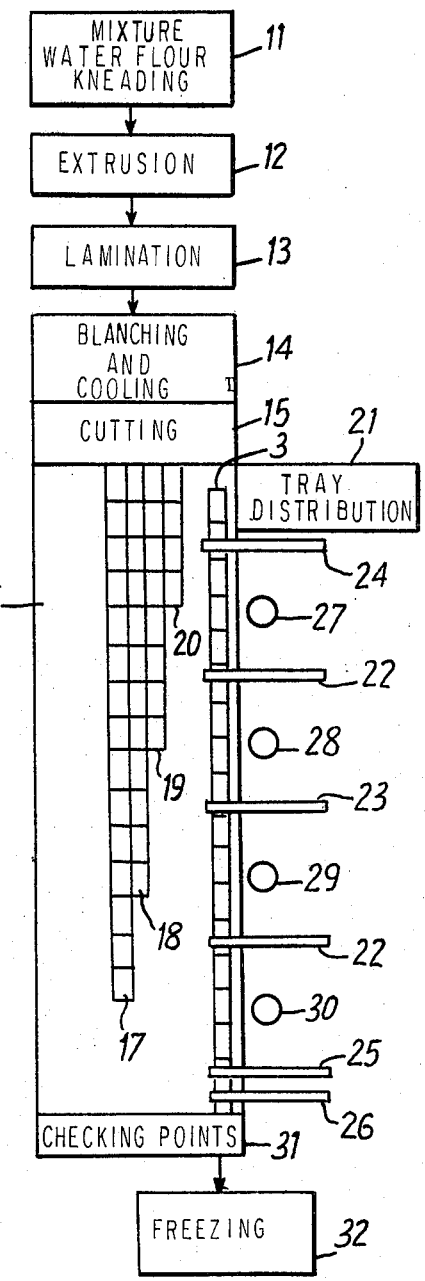

PROCESS FOR MANUFACTURING FROZEN FOOD PRODUCTS COMPOSED OF LAYERS OF PASTA AND SAUCE

BACKGROUND OF THE INVENTION

This invention relates to a process for the overall manufacturing of layers of pasta and sauces and to other products which can also be manufactured by this process.

The food industry is now called upon to supply an ever-increasing number of ready prepared and frozen dishes.

However, whereas certain products can be produced using a fully automatic manufacturing process, other products, such as those known as "lasagne", can only be produced in sufficient quantities in frozen form at an increasingly high cost of labor which does nothing to improve the quality and presentation of these prestige products, since the speed of handling makes it impossible to guarantee a perfect pack.

In fact the production of frozen pasta-based products and especially of lasagne calls for carefully defined precooking conditions aimed at producing a sheet of pasta which can be cut automatically into small rectangles. In turn, these rectangles are individually layered by hand, once each rectangle has been covered whith sauce by automatic sauce dispensers. Thus containers or rather trays are positioned in front of a series of workers who are responsible for placing the pasta rectangles one on top of the other, once these have been covered with sauce, until the finished lasagne are produced.

Due to the high costs involved in this type of semi-auomatic operation, the tendency has been for manufacturers to simply reduce the number of layers of pasta. In spite of this, productivity remains at a fairly low level in comparison with other industrial-scale products, since output is hampered by this manual layering operation, with workers unable to produce more than 40 lasagne packs per minute.

It is obvious that performance can be improved on a weight basis alone when products are destined for the catering trade and not for home consumption. In this case the sheet of pasta is cut into larger pieces so that the frozen end-product will be larger in size and, once cooled, can be divided into portions before being served.

However, while it is advantageous for the manufacturer to supply products of a satisfactory size which are divided into a certain number of portions, the restauranteur has to take geat care when cutting a good quality product into individual portions. In fact, the sauce between the various layers of pasta are sufficiently fluid so that, under the pressure of a cutting knife, a small amount of sauce flows over the edges of the pasta. This tends to spoil the presentation of the single portions of lasagne served.

SUMMARY OF THE INVENTION

The object of this invention is to provide an overall manufacturing process for frozen food products composed of several layers of pasta and other products, usually sauces. The pasta, made from durum semolina, eggs and water, is mixed and laminated and then subjected to a blanching and cooling process suitable for the preparation of this type of product. The characteristic feature of this process is that each phase when the sauces are dispensed takes place in a continuous in-line process between two automatic and continuous phases during which a part of the longitudinal border of the sheet of pasta, which automatically advances along the line, is folded over on to an adjacent surface area previously covered with a layer of the sauces.

In this way, in contrast with previous processes whereby on exit from the blanching and cooling equipment, the pasta was automatically cut to the appropriate size to be subsequently layered manually by the workers, the layers are formed by a series of simple folds of the part of the pasta which is adjacent to the longitudinal border of the sheet of pasta which moves along the line, in such a way that, at the end of the folding and sauce dispensing operations, it suffices to cut the product to the required length to produce a new type of multi-layer product.

This new product, therefore, is characterized by the formation of alternate layers of pasta and sauce, the pasta of which originate from a single folded continuous sheet of pasta, with the sauces being held in place by at least one of the folds in the sheet of pasta.

Experience shows that this new configuration improves the holding power of the finished product, which is firmer and more compact, and enhances the appearance not only of the frozen product but also the appearance of the cooked and served product, since the product tends to rise slightly.

In addition, the product is also suitable for the institutional catering trade since it can be manufactured in an identical manner, without even having to enlarge the width of the sheet of pasta used to manufacture retail products. It suffices to cut the lasagne cross-wise, at intervals corresponding to the various portions, before the product is frozen. A simple cross-wise cut when the product is used will facilitate the division of the lasagne into portions and, in contrast with previous products, since the layers of pasta are all formed from the same continuous folded sheet, the sauces no longer tend to flow over the sides of the product. Also, due to the initial lenght of the product, only a small amount of sauce runs over the longitudinal edges, thus improving the appearance of the end product.

An additional characteristic of the process is that it is possible to manufacture products of different sizes for both the retail market and for institutional catering since the same machine, which is fed in an identical fashion, can produce both types of products by means of a simple adjustment in the speed of the cross-wise cuts after the layers of pasta have been produced.

Another feature of this process consists of a continuous folding over operation whereby the longitudinal borders of the sheet of pasta, which may or may not have already been folded over onto a surface area covered with sauce, are folded onto a part of the sheet covered with sauce; the upper surfaces of these borders, either folded or not, are not directly covered with the sauces.

Experience shows that with this process the conveyor belt can operate at very high speeds, no matter how many folds are involved and that the thickness of the products is virtually standardized both in width and in length, whether these be for home consumption or for the catering trade.

Since the folds are made by means of simple guiding devices consisting of sideways fitted plates, adjusted to given and fixed widths, the speed at which the pasta moves can be identical for products of different lenghths. Once the conditions under which the sheet of pasta slides along the surfaces of the plates at each stage of the various phases of the process have been defined, products with unvarying characteristics, as far as size and quality are concerned, can be manufactured at very high speeds. This process is suitable for manufacturing either products with only 3 layers of pasta or those with 5 or more layers with intermediate layers of sauce being dispensed in a continuous flow on a given width.

A further benefit to be derived from the ease of application of this invention is the possibility of dispensing two different sauces, depending on the type of product to be manufactured, in adjacent rows, thus improving the presentation and enhancing the flavor of the resulting product.

BRIEF DESCRIPTION OF THE DRAWINGS

Additional characteristics and advantages will be stated in the following description made with reference to the drawings which illustrate the ways in which this process can be put into operation and the products which can be manufactured.

In these drawings:

FIG. 1 shows a lasagne product with rectangles of pasta and layers of sauce which has been manufactured by the traditional method.

FIG. 2 shows a product which has been manufactured by the new folding technique described in this invention.

FIG. 3 shows a layout of the production line with the sequence of operations necessary to manufacture the product illustrated in FIG. 1.

FIG. 5 shows an example of a product with 5 layers of pasta manufactured by the process of the present invention.

DETAILED DESCRIPTION OF THE PREFERRED EMBODIMENTS

Figure 4:
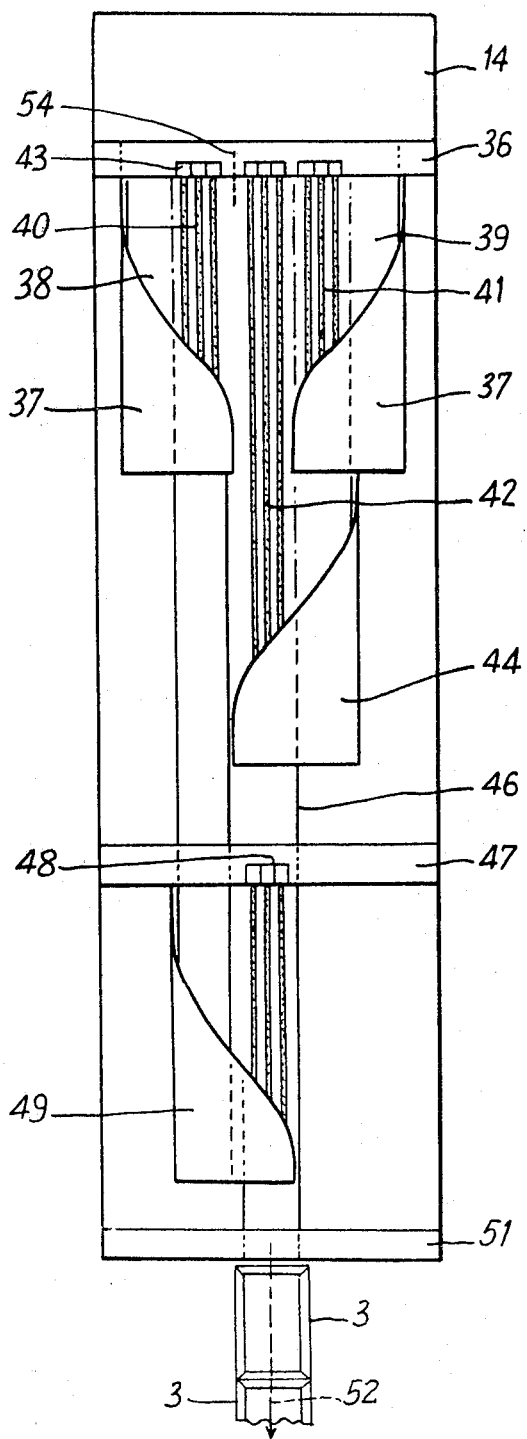
FIG. 4 shows a schematic layout of the successive phases of the automatic folding and sauce dispensing operations described in this invention.

A product composed of layers of pasta and sauce is illustrated in FIG. 1 as it appears before being frozen.

This product 1 rests on an initial rectangle of pasta 2 on the bottom of a tray 3 normally used for frozen products. Rectangle 2 is covered with a sauce 4 (e.g. white sauce) which is topped by a rectangle of pasta 5, covered with another sauce 6 (usually tomato) followed by another rectangle of pasta 7 covered with white sauce 8, topped by a final rectangle of pasta 9 which, depending on the product, is covered with a layer of either parmesan or gruyere cheese 10.

The layout of the process previously adopted to manufacture lasagne of this type is shown in FIG. 3 in which 11 represents the point on the line where the durum semolina flour, water and eggs are mixed in a dough mixer. The pasta is extruded in 12, laminated in 13, blanched and cooled in 14 and finally cut both in width and length in 15. The conveyor belt 16 is fed with four rows of pasta rectangles cut to size 17, 18, 19 and 20. At the same time the trays 3 are automatically distributed in 21 at a pace which is compatible with the speed at which the rows of pasta rectangles 17 to 20 are moving.

Automatic sauce dispensers 22 to 25 add a certain degree of automation to the operation in which the pasta rectangles 17 to 20 are layered by hand by workers 27 to 30. With regard to the sauces, for example white sauce could be dispensed in 22 and tomato in 23, with dispenser 24 being used for a similar type of sauce which ensures that the initial layer of pasta does not stick to the bottom of the tray 3. Point 25 could dispense a final layer of sauce on the top pasta rectangle and dispenser 26 could finishoff the product with a sprinkling of grated cheese.

However, since it has proved impossible to position the pasta rectangles automatically without distortion, 4 workers are stationed at points 26 to 30 who are each responsible for manually placing a rectangle of pasta on top of the one placed in position by the previous worker. A set quantity of sauce is automatically poured over the rectangle when it passes under the dispenser between the two workers. Each tray is then checked at an automatic inspection point 31 before being frozen in 32.

As shown in FIG. 4, the pasta is layered in a series of continuous folding operations, in order to overcome the drawbacks of the previous process i.e. low operation speeds, uneven layering of the pasta and sauces with protruding edges, risk of omitting the odd pasta rectangle or distortion of the rectangles during speedy manual operations, especially in those cases where the rectangles are larger in size and destined for the catering trade. For this purpose at least one long edge of the sheet of pasta on exit from points 14 is guided in such a way as to be subjected to a series of progressive folding operations, during which the pasta continues to advance along the line, with the first fold beng made on to the central or lateral surface area of the sheet of pasta which has already been covered with a selected sauce. This sauce dispensing operation can be carried out at either high or low speeds, which should preferably not vary.

Experience shows that at high speeds there is a dramatic increase in output, which is no longer of the order of 40 packs per minute but rather many packs per second, with the continuous sheet of pasta leaving the cooling equipment at such a speed that when it comes into contact with the folding devices fixed in position at the edges of the sheet, it is automatically folded over without being distorted in any way apart from the folds required, as for example in 33 FIG. 2. It can be seen in this figure that the sheet of pasta forms a continuous folded length of pasta keeping the sauces 35 in place and that these are inserted by means of at least one lateral fold in the sheet of pasta.

To demonstrate the ease with which products of this type can be manufactured by this process, FIG. 4 provides an example of one way in which the process can be put into operation and result in lasagne with 4 layers of sauce between each of the 5 layers of pasta, as shown in FIG. 5.

Instead of cutting the pasta on exit from the blanching and cooling equipment 14, the pasta moves continuously under the first set of automatic sauce dispensers. However, in contrast with the traditional process, the sauce dispenser 36 releases the sauces in a continuous flow, depending on the speed at which the pasta is moving on the belt.

This obviates the need for control devices which are not shown but were in operation at each dispenser owing to the subsequent passage of the trays 3. In addition sauce can be released over all those areas of the sheet of pasta which are not directly involved in the folding operations. In the example provided, the areas which are being folded over by folding devices 37 are 38 and 39, and these will cover the adjacent areas 40 and 41 on either side of the central area 42. Three groups of triple-nozzle sauce dispensers 43 have been shown to illustrate the possibilities and flexibility of this process. These groups are spaced out in relation to the thickness of the lateral folds 46 and 50. Each group can be used to dispense a chosen sauce. However, in order to facilitate an improved pasta/white sauce/tomato sauce ratio, it may be deemed preferable to alternate the various types of sauce within the same group in such a way that when these are dispensed from point 36, the surfaces 40, 42 and 41 are covered with alternate rows of the two sauces.

On exit from the folding device 37, the surfaces 39 and 41, which have already been folded over one on top of the other around the lateral fold 45, are folded over again around the lateral fold 46 on to the central surface area of the pasta sheet by folding device 44. This then passes under yet another sauce dispenser 47 where the triple-head dispenser 48 releases alternate rows of different sauces on the back of surface area 41.

A final folding device 49 folds over the layered surface 38, 40 on to the back of surface 41 around the lateral fold 50. A high-speed cutter 51 slices the product at the same rate at which the trays 3 are fed under the new type of lasagne product thus manufactured.

Since any type of conveyor belt can be used to feed the trays, this has been indicated by arrow 52. These trays, which move in an uninterrupted flow, already contain the sauce onto which the cut portions of lasagne fall.

To changeover from a lasagne pack designed for the retail trade to one destined for institutional catering, it suffices to change the type of trays on the conveyor belt and to merely adjust the cutting length, without having to alter the speed at which the pasta moves along the line.

To manufacture a lasagne pack similar to the one shown in FIG. 2, all that is required is to eliminate one of the folding operations. Owing to the fact that the sheet of pasta is divided into four surfaces areas instead of five, only two groups of sauce dispensers are necessary, with the folding devices 37 positioned near the center of the pasta. On exit from the folding devices, a second dispenser covers the central surface area with sauces. A folding device similar to the one indicated in 44 carries out the final folding operation before the lasagne are cut.

While only one of the possible applications of this process has been described i.e. the production of two new types of lasagne, it is clear that this invention is not limited to the different phases illustrated above and which can be replaced with other similar operations. For example, within the sphere of this invention, fold 50 could be substituted by a cutting line 54, with the folding device 49 being eventually linked to an additional guiding device, thus facilitating the operation whereby, on exit from the folding device 44, the lasagne with three layers of pasta are folded over on to the lasagne with two layers of pasta, produced by folding surface area 38 onto surface area 40 covered with two alternate rows of sauces. Thus a product manufactured in this way differs from the one shown in FIG. 5 in that there is a break in the continuity of the sheet of pasta.

Also within the sphere of this invention, the width of the surface areas can be altered, with the cutter 54 placed on a level with fold 50 shown in FIG. 5. The sheet of pasta is cut in proximity to the central group of sauce dispensers and the edges of the surface areas 40 and 42, which were previously adjacent to one another, are moved to suppress the lateral part of the pasta which united the left edges of surface areas 40 and 42 in FIG. 5. Finally the folds can be made over several surface areas, for example with the folding device 37, which folds over surface area 38, folding over a surface area twice the size made up of surface area 38 plus a similar surface area, onto the two surface areas 40 and 42.

I claim:

1. A process for automatically and continuously manufacturing food products, comprising the sequential steps of:

mixing a plurality of ingredients into a mixer to form dough;

extruding said dough from said mixer to form a continuous sheet of pasta having first (38), second (40), third (42), fourth (41), and fifth (39) adjacent longitudinal surface area rows;

passing said continuous sheet of pasta under a first sauce dispenser;

dispensing first sauces from said first sauce dispenser onto said second, third, and fourth adjacent surface area rows, said second, third and fourth adjacent surface area rows being between first and second outer end surface area rows which comprise said first and fifth surface area rows;

first folding said respective first and fifth surface area rows by means of first and second guides (37) over said second and fourth surface area rows, respectively, said respective first and fifth surface area rows substantially covering said second and fourth surface area rows, said second and fourth area rows being spaced apart along a widthwise direction of said sheet of pasta and being on opposite sides of said third surface area row;

second folding said fourth and fifth surface area rows over said third surface area row by means of a third guide (44);

dispensing additional sauce over one of said first and fourth surface area rows by means of a second sauce dispenser (47);

third folding said one of said first and fourth surface area rows which does not have said additional sauce dispensed thereon over said one of said first and fourth surface area rows which has said additional sauce dispensed thereon by means of a fourth guide (49), said continuous sheet of pasta continuously passing said first sauce dispenser, passed said first, second and third guides, passed said second sauce dispenser and passed said fourth guide.

2. The process as claimed in claim 1, wherein said first and fifth surface area rows are first folded simultaneously by said first and second guides (37), said fourth and fifth surface area rows being second folded subsequent to said first folding of said first and fifth surface area rows, and said third folding being conducted subsequent to said second folding and after dispensing said additional sauce.

3. The process as claimed in claim 1, wherein said first, second and third folding steps and said step of dispensing said first sauces and said additional sauce are all conducted in a continuous manner.

4. The process as claimed in claim 3, wherein said step of dispensing first sauces is conducted by dispensing sauces simultaneously from three sets of nozzles (43)

in order to dispense rows of sauces of at least two different types.

5. The process claimed in claim 4 whereby at least one fold is proceded by a continuous and longitudinal cut (54) in the sheet of pasta made by a transverse cutting device (51).

6. The process claimed in claim 5 whereby the transverse cutting device (51) comprises adjusting means for adjusting a cutting position of said cutting device.

7. The process as claimed in claim 4, further comprising the steps of laminating, baking and cooling said sheet of pasta subsequent to said extrusion step and prior to said passing step.

8. The process as claimed in claim 7, wherein said ingredients comprise durum semolina, eggs and water.

9. The process as claimed in claim 4, further comprising the steps of cutting said sheet of pasta into predetermined sizes after said third folding step, placing each predetermined size of pasta into a corresponding food tray, and freezing each said predetermined size of pasta and corresponding food tray.

10. The process as claimed in claim 9, wherein said frozen food products comprise lasagne.

* * * * *

UNITED STATES PATENT AND TRADEMARK OFFICE
CERTIFICATE OF CORRECTION

PATENT NO. : 4,418,085

DATED : November 29, 1983

INVENTOR(S) : Louis E. Bicquelet

It is certified that error appears in the above-identified patent and that said Letters Patent is hereby corrected as shown below:

On the title page:

The inventor's name should read:-- Louis E. Bicquelet --

The name of the assignee should read:

-- Buitoni Foods Corporation, South Hackensack, N.J. --.

Signed and Sealed this

Fifteenth Day of May 1984

[SEAL]

Attest:

Attesting Officer

GERALD J. MOSSINGHOFF

Commissioner of Patents and Trademarks